UNITED STATES PATENT OFFICE 2,418,696

MODIFYING THE DYEING PROPERTIES OF CELLULOSE OR CELLULOSE DERIVATIVE TEXTILE MATERIALS

Walter Glen Cameron and Thomas Henry Morton, Braintree, England, assignors to Courtaulds Limited, London, England, a British company No Drawing. Application February 9, 1943, Serial No. 475,283. In Great Britain March 9, 1942

1 Claim. (Cl. 8—100)

This invention relates to the improvements of the dyeing properties of cellulosic material, under which term we include both cellulose and also derivatives of cellulose such as cellulose acetate. We obtain this improvement by incorporating in the said materials a compound of an aliphatic aldehyde, such for instance as formaldehyde and aldol, with a compound represented by the formula X—NH—C(NH)—NYZ, where X is a member of the group consisting of hydrogen and $NH_2$—C(NH)—, Y is an organic radical of the group consisting of alkyl, aralkyl and heterocyclic radicals and may be substituted, while Z is a member of the group consisting of hydrogen, alkyl radicals, aralkyl radicals and heterocyclic radicals, and in which the radical may be substituted, while the substituents Y and Z may together constitute a chain forming a ring with the N atom. If desired Y may be a polyvalent radical such as the ethylene radical from ethylene diamine, which will combine with two biguanide or guanidine residues. The compounds represented by the formula are substituted guanidines and substituted biguanides, and as examples of such compounds we mention monoethanol biguanide, ethylene dibiguanide, monoethanol guanidine and ethylene diguanidine. They can be obtained by the reaction of a primary or secondary amine with cyanamide or dicyandiamide or a mixture of such products, and if desired, the reaction products of such amines and cyanamide or dicyandiamide may be used directly without purification, or they can be treated so as to obtain the substituted biguanide or substituted guanidine in a more or less purified form. As further examples of substituted biguanides or substituted guanidines which can be employed according to this invention, we mention those obtainable when making use of piperidine, hydroxyethylethylene diamine, and triethylene tetramine and diethanolamine. The condensation of the aldehyde and the above mentioned substituted biguanides or substituted guanidines, whether these latter be employed in the purified or unpurified condition, may be carried out in the absence of a catalyst or in the presence of an acid, neutral or alkaline catalyst.

After impregnating the textile material with the solution containing the aldehyde and the substituted biguanide or substituted guanidine, in which solution a preliminary condensation of the two compounds may have taken place, the material is dried and heated to complete the reaction. We regard the use of an impregnating solution containing more or less of the preliminary condensation product as equivalent to the use of an impregnating solution containing the aldehyde and substituted guanidine or the substituted biguanide. The resulting basified fibres have a good affinity for acid dyestuffs and when dyed have a good fastness against the action of light. The said products from an aldehyde and a substituted biguanide or substituted guanidine may be incorporated with the cellulose fibre either alone or in admixture with other soluble condensation products, such for instance as a soluble urea - formaldehyde or thiourea - formaldehyde precondensate, which, of themselves, do not impart substantial wool-dyeing properties.

The following examples will serve to illustrate the nature of this invention, which however is not limited to these examples.

Example 1

A solution containing 2 per cent of ethylenedibiguanide and 6 per cent of 40 per cent formaldehyde solution is adjusted to pH 9.0 with sodium hydroxide. Material consisting of cellulose staple fibre sold under the registered Trade-Mark "Fibro" is impregnated with this solution, and then squeezed until it contains its own weight of the solution. It is then dried at 60° centigrade and then heated at 140° centigrade for 15 minutes. The treated material has a good affinity for acid dyes and after dyeing a good light fastness.

Example 2

A solution containing 2 per cent of monoethanol-biguanide and 8 per cent of 40 per cent formaldehyde solution is adjusted to pH 3.5 by the addition of ammonium chloride. The cellulose material in the form of "Fibro" staple fibre is impregnated with this solution and then mangled to 100 per cent expression. It is then dried at 60° centigrade and afterwards heated to 140° centigrade for 20 minutes. The thus treated material has a good affinity for acid dyes and after dyeing a good light fastness.

Example 3

A solution containing 3 per cent of pentamethylene-biguanide and 12 per cent of a 40 per cent solution of formaldehyde is adjusted to pH 3.5 with hydrochloric acid, and material consisting of "Fibro" staple fibre is impregnated with this solution. It is then squeezed until it contains about 100 per cent of the solution, and the condensation is completed by drying and then heating at 140° centigrade for 15 minutes. The treated material has an affinity for acid dyes.

Example 4

A solution containing 2 per cent of ethylenedibiguanide and 2 per cent of aldol is adjusted to pH 9.0 with sodium hydroxide. Cellulosic material is impregnated and then squeezed to about 100 per cent expression, dried at 60° centigrade and the condensation completed by heating at 145° centigrade for 10 minutes. The treated material has a good affinity for acid dyes and after dyeing a good light fastness.

Example 5

2 mols of dicyandiamide and 1 mol of ethylene diamine hydrochloride are heated together until the temperature of the reaction mixture reaches 250° centigrade. A solution containing 2 per cent of the resulting product and 8 per cent of a 40 per cent formaldehyde solution is adjusted to pH 9.5 with sodium hydroxide and material consisting of "Fibro" staple fibre is impregnated with this solution. After mangling to 100 per cent expression, the treated material is dried and heated at 140° centigrade for 15 minutes.

Example 6

A solution containing 2 per cent of the reaction product of cyanamide and ethylene diamine hydrochloride and 8 per cent of a 40 per cent formaldehyde solution is adjusted to pH 3.5 with hydrochloric acid and the material is impregnated with this solution. After mangling to 100 per cent expression, the condensation is completed by drying and heating at 140° centigrade for 20 minutes.

What we claim is:

The process of improving the dyeing properties of cellulosic material by treating the material before dyeing with an aqueous solution containing an aliphatic aldehyde and a compound represented by the formula $$NH_2-C(NH)-NH-C(NH)-NYZ$$

where Y is an organic radicle of the group consisting of hydroxy ethyl, biguanide ethyl, ethylamino, triethylene triamino, and cyclic radicles joined with Z, while Z is a member of the group consisting of hydrogen, hydroxyethyl and cyclic radicles joined with Y, drying the treated material and heating to complete the reaction between the said aldehyde and the said compound.

WALTER GLEN CAMERON.
THOMAS HENRY MORTON.

REFERENCES CITED

The following references are of record in the file of this patent:

UNITED STATES PATENTS

| Number | Name | Date |
|---|---|---|
| 2,121,227 | Brodersen et al. | June 21, 1938 |
| 2,123,152 | Rivat | July 5, 1938 |
| 2,111,698 | Siefert et al. | Mar. 22, 1938 |
| 2,145,011 | Landolt et al. | Jan. 24, 1939 |
| 2,189,918 | Moncrieff | Feb. 13, 1940 |
| 1,780,636 | Stine | Nov. 4, 1930 |
| 2,263,289 | D'Alelio et al. | Nov. 18, 1941 |